US012736495B2

(12) United States Patent
Vadnere et al.

(10) Patent No.: US 12,736,495 B2
(45) Date of Patent: Sep. 15, 2026

(54) MOISTURE SENSOR FOR ROUND BALERS

(71) Applicant: DEERE & COMPANY, Moline, IL (US)

(72) Inventors: Mohan A. Vadnere, Hadapsar (IN); Umesh B. Jadhao, Hadapsar (IN); Sourabha S. Gokhale, Hadapsar (IN)

(73) Assignee: DEERE & COMPANY, Moline, IL (US)

( * ) Notice: Subject to any disclaimer, the term of this patent is extended or adjusted under 35 U.S.C. 154(b) by 205 days.

(21) Appl. No.: 18/329,737

(22) Filed: Jun. 6, 2023

(65) Prior Publication Data

US 2024/0410852 A1 Dec. 12, 2024

(51) Int. Cl.
*G01N 27/22* (2006.01)
*A01F 15/08* (2006.01)
(Continued)

(52) U.S. Cl.
CPC ....... *G01N 27/223* (2013.01); *A01F 15/0833* (2013.01); *A01F 15/141* (2013.01);
(Continued)

(58) Field of Classification Search
CPC .... A01F 15/07; A01F 15/0833; A01F 15/141; A01F 15/08; G01N 35/00871;
(Continued)

(56) References Cited

U.S. PATENT DOCUMENTS

| | | | | |
|---|---|---|---|---|
| 2010/0005881 A1* | 1/2010 | Broedel | G01N 33/0059 | 73/335.02 |
| 2012/0103205 A1* | 5/2012 | Kraus | A01F 15/08 | 100/2 |

(Continued)

FOREIGN PATENT DOCUMENTS

| | | |
|---|---|---|
| CN | 207717125 U | 8/2018 |
| CN | 115428831 A | 12/2022 |

(Continued)

OTHER PUBLICATIONS

Extended European Search Report and Written Opinion issued in European Patent Application No. 24176939.7 dated Nov. 4, 2024, in 12 pages.

*Primary Examiner* — Eman A Alkafawi
*Assistant Examiner* — Suresh K Rajaputra
(74) *Attorney, Agent, or Firm* — Michael Best & Friedrich LLP

(57) ABSTRACT

A device, method, and system for determining a moisture level of for an agriculture machine. receiving crop material in a chamber of the agriculture machine. Determine a humidity of the chamber of the agriculture machine using a first signal of a first sensor of a moisture sensor assembly. The first signal is representative of humidity inside the chamber. Determine a humidity of an operating environment external to the agriculture machine using a second signal of a second sensor of the moisture sensor assembly. The second signal is representative of the humidity of an ambient environment of the agriculture machine. Determine a moisture level of the crop material in the chamber of the agriculture machine using the humidity inside the chamber and the operating environment. Modify operation of the agriculture machine based at least in part on the moisture level of the crop material in the chamber.

20 Claims, 4 Drawing Sheets

(51) Int. Cl.
*A01F 15/14* (2006.01)
*G01N 35/00* (2006.01)

(52) U.S. Cl.
CPC .................. *G01N 35/00871* (2013.01); *G01N 2035/00881* (2013.01); *G01N 2035/009* (2013.01); *G01N 2035/0091* (2013.01)

(58) Field of Classification Search
CPC ............... G01N 27/223; G01N 27/048; G01N 2035/0091; G01N 2035/00881; G01N 2035/009
See application file for complete search history.

(56) References Cited

U.S. PATENT DOCUMENTS

2014/0060348 A1* 3/2014 Hall .................... A01D 46/085 100/99
2016/0088800 A1* 3/2016 Lang .................... B30B 9/3078 56/10.2 R
2017/0086381 A1* 3/2017 Roell .................. A01B 79/005
2017/0156268 A1 6/2017 Schrag et al.
2021/0144919 A1* 5/2021 Romoser .............. A01D 41/127
2023/0152264 A1* 5/2023 Johansen ............ G01N 27/048 324/664
2023/0175996 A1* 6/2023 Simmons ........... A01F 15/0715 56/10.2 B
2023/0180667 A1* 6/2023 Schlichting ............ A01F 15/07 56/432

FOREIGN PATENT DOCUMENTS

EP 3001895 A1 4/2016
GB 2610846 A1 3/2023

* cited by examiner 100
102
110
112
114
116
118

100
110
112
114
117
130

100
110
112
114
116
120
121
122
130

100
110
112
114
117
120
123
124
130

MOISTURE SENSOR FOR ROUND BALERS

BACKGROUND

The present disclosure relates to a device, a system, and a method of determining a level of moisture in an agriculture machine. More specifically, the present disclosure relates a sensor, a system, and a method of controlling operation of an agriculture machine based on a moisture level of crop material in the agriculture machine.

SUMMARY

An embodiment provides a moisture sensor assembly. The moisture sensor assembly includes a housing, at least two sensors, and an electronic controller. The housing defines at least two apertures therethrough. The housing impedes material deposits associated with operation of the agriculture machine from entering the housing. The at least two sensors disposed within the housing. A first sensor measures a humidity inside a chamber of the agriculture machine. A second sensor measures a humidity of an operating environment of the agriculture machine. The electronic controller is communicably coupled to the at least two sensors. The electronic controller receives, from the first sensor, a first signal representative of the humidity inside the chamber of the agriculture machine. The electronic controller receives, from the second sensor, a second signal representative of the humidity of the operating environment external to the agriculture machine. The electronic controller determines a moisture level of the crop material in the chamber of the agriculture machine based at least in part on the humidity inside the chamber and the humidity of the operating environment. The electronic controller modifies operation of the agriculture machine based at least in part on the moisture level of the crop material in the chamber.

Another embodiment provides a control system for an agriculture machine. The control system includes a moisture sensor assembly and an electronic controller. The moisture sensor assembly includes at least two sensors. A first sensor measures a humidity inside a chamber of the agriculture machine. A second sensor measures a humidity of an operating environment external to the agriculture machine. The electronic controller includes an electronic processor and a memory. The electronic controller communicably coupled to the at least two sensors. The electronic processor receives, from the first sensor, a first signal representative of the humidity inside the chamber of the agriculture machine. The electronic processor receives, from the second sensor, a second signal representative of the humidity of the operating environment external to the agriculture machine. The electronic processor determines a moisture level of crop material in the chamber of the agriculture machine based at least in part on the humidity inside the chamber and the humidity of the operating environment. The electronic processor modifies operation of the agriculture machine based at least in part on the moisture level of the crop material in the chamber.

Another embodiment provides a method for modifying operation of an agriculture machine based on a moisture level of crop material. The agriculture machine receives crop material in a chamber. The agriculture machine is a cylindrical baler. An electronic processor determines a humidity of the chamber of the agriculture machine based on a first signal of a first sensor of a moisture sensor assembly. The first signal is representative of the humidity inside the chamber of the agriculture machine. The electronic processor determines a humidity of an operating environment external to the agriculture machine based on a second signal of a second sensor of the moisture sensor assembly. The second signal is representative of the humidity of an ambient environment of the agriculture machine. The electronic processor determines a moisture level of the crop material in the chamber of the agriculture machine based at least in part on the humidity inside the chamber and the humidity of the operating environment. The electronic processor modifies operation of the agriculture machine based at least in part on the moisture level of the crop material in the chamber.

Other aspects of the disclosure will become apparent by consideration of the detailed description and accompanying drawings.

DETAILED DESCRIPTION

Figures 1A, 1B, 1C, 1D:
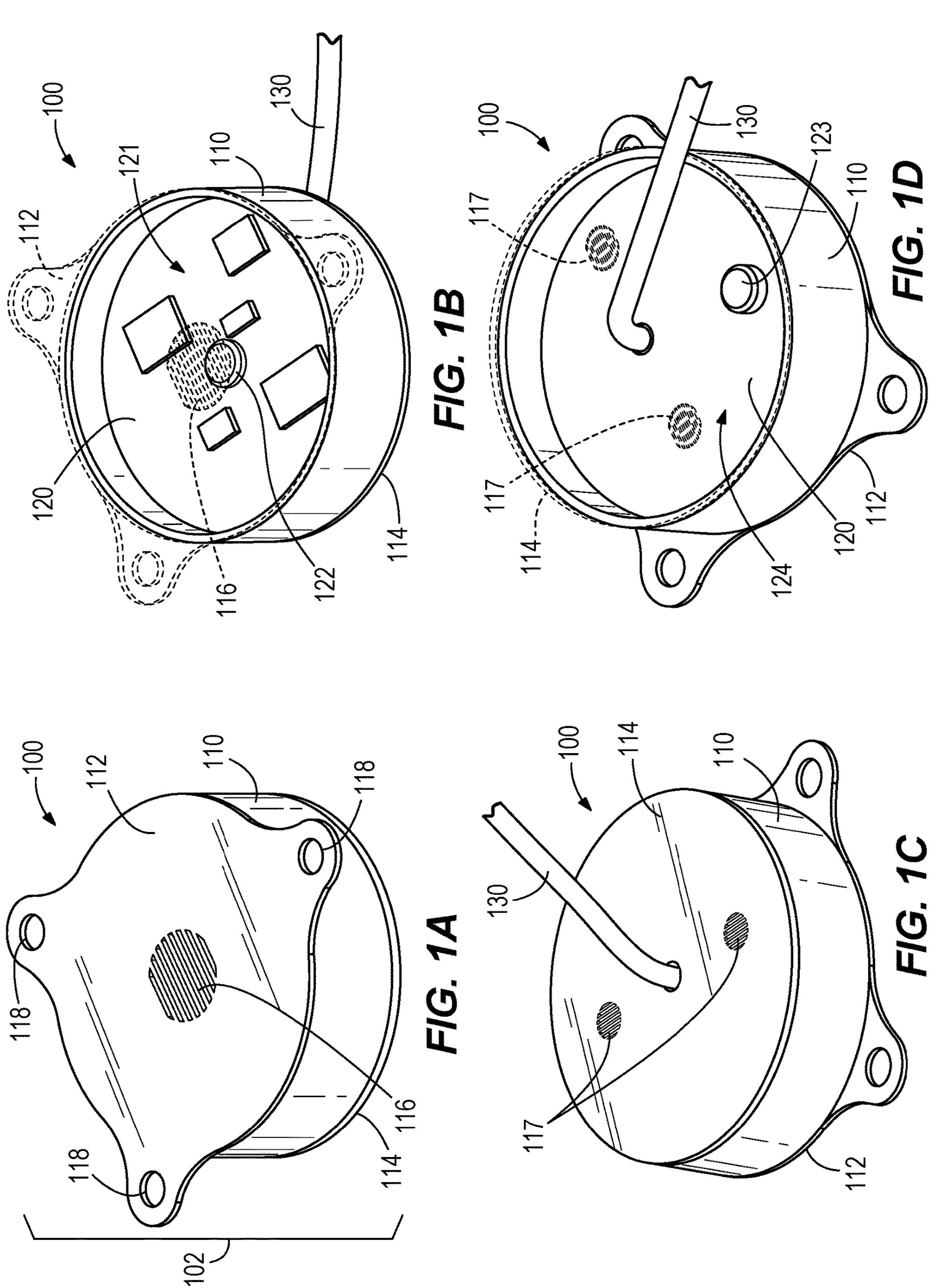
FIGS. 1A-1D are perspective views of a moisture sensor according to embodiments in the present disclosure.

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways.

Various embodiments of the present disclosure provide a sensor and system that measures the moisture of crop material inside a baling chamber of an agriculture machine without contact with the crop material. In some implementations, the sensor includes a housing that impedes deposits of crop material and other matter from accumulating on the sensor. The accumulation of the deposits negatively impact the accuracy of the sensor. In other implementations, the sensor provides high accuracy measurements that are independent of environment and weather conditions by using dual relative humidity measurements of ambient humidity of the agriculture machine and humidity inside the baling chamber of the agriculture machine. In yet other implementations, the system makes moisture data for crop material of the baling chamber accessible to an operator of the agriculture machine, notifies the operator when a moisture level of the crop material of the agriculture machine exceeds a threshold level, and modifies settings of the agriculture machine based on the moisture level.

Moisture sensors are designed and positioned to make contact with crop material to accurately measure the moisture in the crop material. Currently, moisture sensors are positioned in the path of crop material that enters the agriculture machine, this positioning results in deposits from contact with the crop material forming on the moisture sensors. The deposits negatively impact accuracy of readings of capacitive and resistive sensing devices. Additionally, lower crop growth rates and bales with initially loose crop (e.g., loose bale cores) also impact the reliability of moisture sensor readings. Thus, it would be advantageous to provide a sensor and system that reduces the amount of crop deposits that accumulate on the sensing device and eliminates the need to contact the crop material to accurately measure the moisture of crop material in an agriculture machine.

Various embodiments of the present disclosure provide a device, a system, and a method to determine, with no contact of crop material, a moisture level of the crop material in a baling chamber of an agriculture machine based on the humidity inside a baling chamber and the humidity of an operating environment of the agriculture machine. Additionally, embodiments of the present disclosure provide a device, a system, and a method for controlling operation of the agriculture machine based on the moisture level of the crop material in the baling chamber. Further, embodiments of the present disclosure provide a device, a system, and a method for trigger alerts and other notifications for a user or operator that indicate in real time that corrections are required to adhere to a set of crop bale settings.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

A plurality of hardware and software-based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

FIG. 1A through 1D illustrate an example of a moisture sensor assembly 100 for determining a moisture level of crop material in an agriculture machine without contacting the crop material, i.e., the moisture sensor in no manner contacts the crop material for which the moisture level is or is being determined. As shown in FIG. 1A the moisture sensor assembly 100 includes a housing 102. The housing includes a body 110, a first cover plate 112, and a second cover plate 114. The first cover plate 112 is coupled to a first end of the body 110. The second cover plate 114 is coupled to a second end of the body 110. The first cover plate 112 is positioned opposite of the second cover plate 114 to form a chamber within the housing 102. The first cover plate 112 includes a first aperture 116 and a mounting hole 118. The first aperture 116 is configured to allow air to flow into the chamber of the housing 102 and prevent or hinder crop material and/or deposits from the crop material from building up inside the housing and affecting the accuracy of measurements of the moisture sensor assembly 100. In some embodiments, the moisture sensor assembly 100 includes multiple instances of the first aperture 116, i.e., two or more apertures 116. The mounting hole 118 is configured to allow the moisture sensor assembly 100 to be mounted to a surface of the agriculture machine. In some embodiments, the moisture sensor assembly 100 includes two or more mounting holes 118.

FIG. 1B illustrates an example of the moisture sensor assembly 100 through the first cover plate 112 (illustrated as transparent for locating the first aperture 116). The housing 102 includes a printed circuit board (PCB) 120. The PCB 120 is disposed within a chamber of the housing 102 forming a first sub-chamber 121 and opposing a second sub-chamber 124, the second sub-chamber 124 described in greater detail below. The first sub-chamber 121 is formed between the PCB 120 and the first cover plate 112. The first sub-chamber 121 is sealed off from the second sub-chamber 124. The PCB 120 includes a first sensor 122 and a wire 130. The first sensor 122 is coupled to the PCB 120 and configured to measure humidity in the air of the first sub-chamber 121 of the housing. In some implementations, the first sensor 122 includes a sensor tip comprised of polymer material. A capacitance of the polymer material changes when exposed to humidity. In those implementations, the first sensor 122 detects a change in capacitance of the polymer material and generates a signal that indicates the change in capacitance that is detected. In some embodiments, the first sensor 122 is positioned to align with the first aperture 116, which prevents, hinders, or obstructs crop material and/or deposits from the crop material from contacting the first sensor 122 and affecting the accuracy of measurements of the first sensor 122. The wire 130 is communicably coupled to the PCB 120 and configured to provide data and/or power to and from components of the PCB 120.

As shown in FIG. 1C the second cover plate 114 includes a second aperture 117. The second aperture 117 is configured to allow air to flow into the chamber of the housing 102 and prevent or minimize crop material and/or deposits from an operating environment of the agriculture machine from building up inside the housing and affecting the accuracy of measurements of the moisture sensor assembly 100. In some embodiments, the moisture sensor assembly 100 includes two or more apertures 117. The second cover plate 114 can include an opening that the wire 130 passes through to connect to the PCB 120.

FIG. 1D illustrates an example of the moisture sensor assembly 100 through the second cover plate 114 (illustrated as transparent for locating the second aperture 117). FIG. 1D depicts an example of the moisture sensor assembly 100 with a perspective view, through the second cover plate 114, of the second sub-chamber 124 of a chamber of the housing 102. The PCB 120 also includes a second sensor 123. The second sensor 123 is coupled to the PCB 120 and configured to measure humidity in the air of the second sub-chamber 124 of the housing. In some implementations, the second sensor 123 includes a sensor tip comprised of polymer material. A capacitance of the polymer material changes when exposed to humidity. In those implementations, the second sensor 123 detects a change in capacitance of the polymer material and generates a signal that indicates the change in capacitance that is detected. In some embodiments, the second sensor 123 is positioned to align with the second aperture 117, which prevents, hinders, or obstructs crop material, foreign material of the ambient environment, and/or deposits from the crop material from contacting the second sensor 123 and affecting the accuracy of measurements of the second sensor 123. In other embodiments, the second sensor 123 is positioned to not align with the second aperture 117, which further impedes crop material, foreign material of the ambient environment, and/or deposits from the crop material from contacting the second sensor 123.

Figures 2A, 2B, 2C:
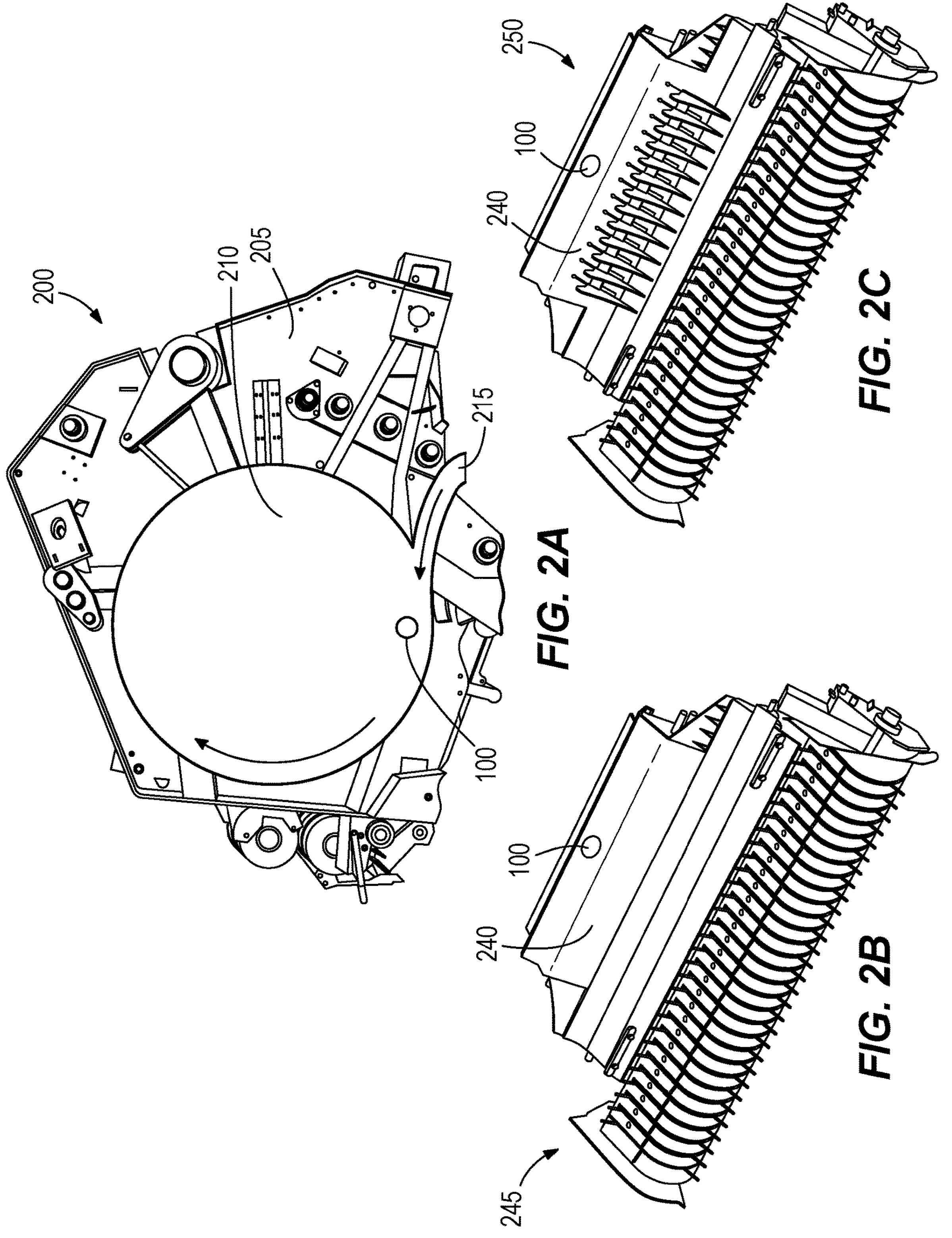
FIG. 2A is a view through a side wall of an agriculture machine that includes the moisture sensor of FIGS. 1A-1D according to embodiments in the present disclosure.
FIG. 2B is a top view and a bottom view of a crop material pick up mechanism that includes the moisture sensor of FIGS. 1A-1D according to embodiments in the present disclosure.
FIG. 2C is a bottom view of a crop material pick up mechanism that includes the moisture sensor of FIGS. 1A-1D according to embodiments in the present disclosure.

FIG. 2A illustrates a baler chamber side view through a side wall of an agriculture machine 200 that includes the moisture sensor assembly 100. The agriculture machine 200 includes a cylindrical baler 205. In this example, the cylindrical baler 205 is physically and communicatively coupled to the agriculture machine 200 such that the agriculture machine 200 is configured to pull the cylindrical baler 205 across a field during operation. While the illustrated the cylindrical baler 205 is pulled by the agriculture machine 200, it is understood that in other embodiments the cylindrical baler 205 may be self-propelled. The cylindrical baler 205 includes a baler chamber 210, a crop material inlet 215, and the moisture sensor assembly 100. The baler chamber 210 is an area where crop material is compressed to form a bale. In some implementations, the baler chamber 210 is a variable baling chamber. In other implementations, the baler chamber 210 is a fixed chamber. The crop material inlet 215 is an opening through which crop material is fed into the baler chamber 210. For example, the crop material inlet 215 feeds crop material into the baler chamber along a path indicated by an arrow in the opening of the crop material inlet 215. In this example, the path of the crop material is proximate to the moisture sensor assembly 100 and continues into the baler chamber 210 to form a bale along a path indicated by an arrow in the baler chamber 210.

The cylindrical baler 205 receives crop material from the crop material inlet 215 while moving across a field and processes the crop material to form a crop package, such as, for example, a cylindrical bale. The cylindrical baler 205 can include a frame supported on one or more ground engaging devices or wheels. The cylindrical baler 205 can include a draft tongue coupled to the frame at one end with a hitch arrangement at the other end configured to couple the cylindrical baler 205 to an agricultural vehicle (not shown). In some embodiments, the cylindrical baler 205 can include one or more side walls fixed to the frame. In some embodiments, the cylindrical baler 205 can include one or more gates pivotally mounted to the cylindrical baler 205. Each of the one or more gates can include side walls. The one or more gates are selectively operable for accessing the inside of the cylindrical baler 205. The baler chamber 210 is defined at least in part by the side walls fixed to the frame or the one or more gates and the cylindrical baler 205. The distance between a first side wall and a second side wall fixed to the frame or of the one or more gates defines the width of the baler chamber 210.

In some embodiments, the moisture sensor assembly 100 is mounted to a side wall of the cylindrical baler 205. For example, the moisture sensor assembly 100 is positioned proximate to the opening of the crop material inlet 215 where crop material enters the baler chamber 210. In general, the moisture sensor assembly 100 is configured to measure the humidity of the contained environment or space (i.e., the air) within the baler chamber 210 using a first sensor and to measure the ambient humidity of the operating environment surrounding the agriculture machine 200 using a second sensor. For example, the moisture sensor assembly 100 is positioned to expose, through an opening (e.g., a hole in a surface) in the agriculture machine 200, the first aperture 116 to the baler chamber 210 and the second aperture 117 to the operating environment through which the agriculture machine 200 travels.

As crop material enters the baler chamber 210 the moisture sensor assembly 100 determines a moisture level or humidity of the air within the baler chamber 210. This humidity level may be enhanced by the presence of water on the surface of or within the structure of the crop material itself released in the baler chamber 210, but the sensed humidity or water content or moisture level within the baler chamber 210 is not based on direct contact with the crop material-only on sensing the air within the baler chamber 210 interior. In other words, the moisture sensor assembly 100 detects humidity as water vapor in the air of the baler chamber 210, not water content directly on a surface of or within crop material entering and processed through the baler chamber 210.

FIG. 2B illustrates an example of a top view 245 of a crop material pick up mechanism 240 of the agriculture machine 200 that includes the moisture sensor assembly 100. The agriculture machine 200 includes the crop material pick up mechanism 240. In this example, the crop material pick up mechanism 240 is physically and communicatively coupled to the cylindrical baler 205 and/or the agriculture machine 200. As the agriculture machine 200 moves through a field, the crop material pick up mechanism 240 feeds crop material from the ground surface into the crop material inlet 215 of the cylindrical baler 205, which rolls the crop material in spiral fashion into a cylindrical bale. The crop material pick up mechanism 240 may include various pick-up apparatus including, but not limited to, tines, forks, augers, conveyors, baffles, a cutter or pre-cutter assembly, or any combination of the preceding. In some embodiments, the moisture sensor assembly 100 is mounted to a surface of the crop material pick up mechanism 240. As shown in the top view 245 of FIG. 2B, the moisture sensor assembly 100 is mounted to a surface of the crop material pick up mechanism 240. The moisture sensor assembly 100 is positioned in an opening of the crop material pick up mechanism 240 that feeds the crop material to the baler chamber 210 and measures the humidity of the baler chamber 210.

FIG. 2C illustrates an example of a bottom view 250 of a crop material pick up mechanism 240 of the agriculture machine 200 that includes the moisture sensor assembly 100 depicted in FIG. 2B. As shown in the bottom view 250 of FIG. 2C, the moisture sensor assembly 100 is also configured to measure the humidity of an operating environment underneath the agriculture machine 200.

Figure 3:
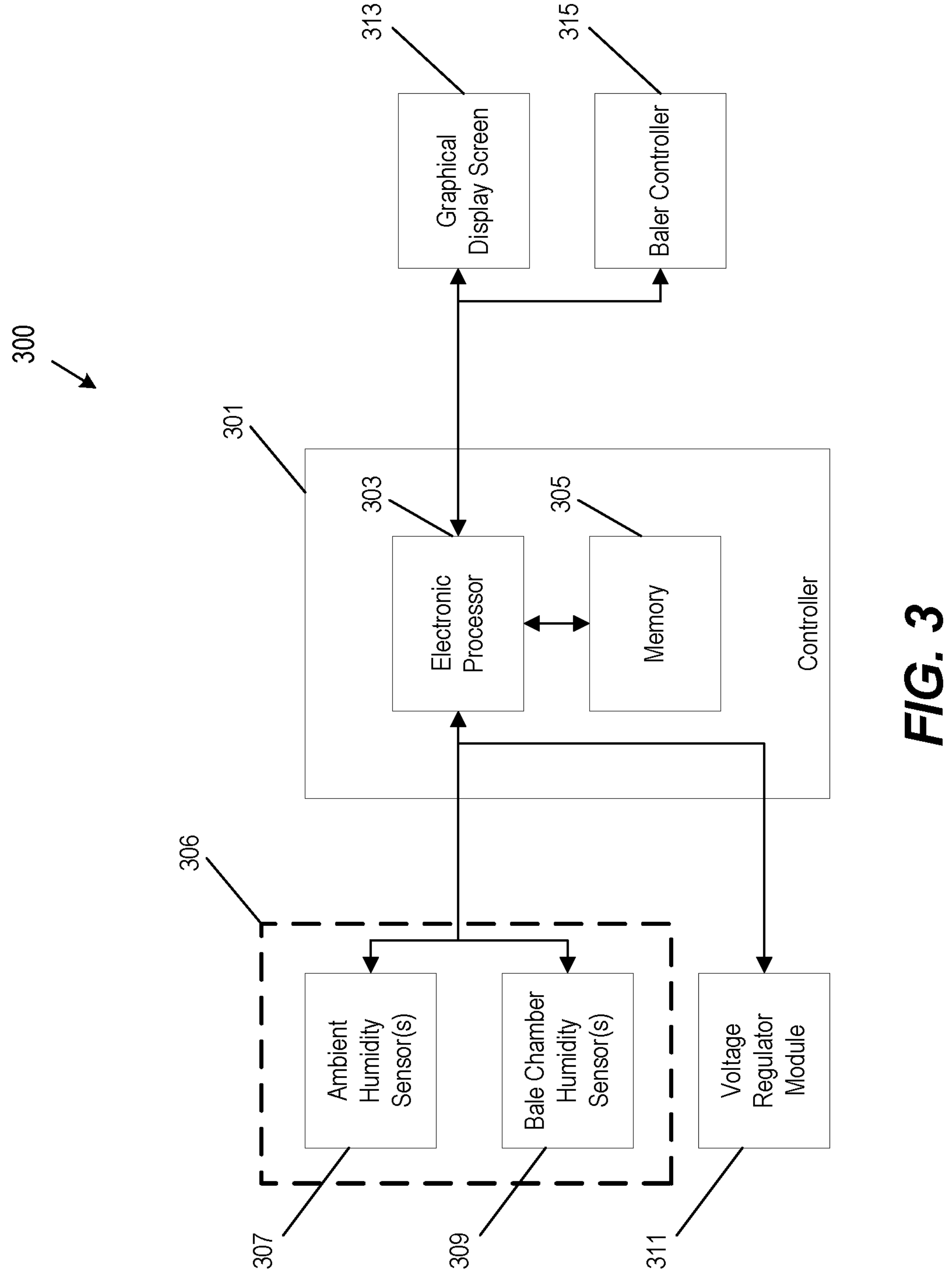
FIG. 3 is a schematic of a control system according to embodiments in the present disclosure.

FIG. 3 illustrates an example of a control system 300 of the agriculture machine 200, the system 300 configured to 1) determine and display a moisture level of the crop material of the agriculture machine 200 and 2) notify a user of the agriculture machine 200 that a moisture level of the crop material in the bale chamber exceeds a threshold moisture level. The system 300 includes an electronic controller 301 that includes an electronic processor 303 and a non-transitory, computer-readable memory 305. The memory 305 is communicatively coupled to the processor 303 and is configured to store data and instructions that, when executed by the processor 303, cause the controller 301 to perform functionality such as described herein. The controller 301 can be physically mounted to the agriculture machine 200 or, in some implementations, provided as a remotely located computer system or server configured to wirelessly communicate with a local controller of the agriculture machine 200 and/or other individual components of the agriculture machine 200. In some embodiments, the memory 305 is utilized to implement a CAN message buffer, which is configured to store received messages and/or written messages that are to be transmitted. In some implementations, the functionality of the controller 301 as described herein may be distributed between multiple different controllers including, for example, a local controller and a remote computer system (e.g., a remote server computer) in wireless communication with each other. For example, the remote server computer represents a server computing system utilizing multiple computers as a server system, such as in a cloud computing environment. In this example, the remote server computer can be a laptop computer, a tablet computer, a netbook computer, a personal computer (PC), a desktop computer, a personal digital assistant (PDA), a smart phone, or any programmable electronic device capable of communicating with the agriculture machine 200, other individual components of the agriculture machine 200, and/or other computing devices (not shown) within a distributed data processing environment. In some instances, the remote server computer represents a computing system utilizing clustered computers and components (e.g., database server computers, application server computers, etc.) that act as a single pool of seamless resources when accessed within a distributed data processing environment.

In the example of FIG. 3, the system 300 includes a sensor assembly 306, a voltage regulator module 311, a graphical display screen 313, and a bale controller 315. While the various sensors are discussed in detail herein, it is understood that other forms of sensors mounted in different locations may also be used to collect similar information and data types. Furthermore, while the below sensors are physical in nature, it is understood that in other embodiments virtual sensors or models may also be used to detect or model the data or information needed.

The sensor assembly 306 includes an ambient humidity sensor 307 and a bale chamber humidity sensor 309. The ambient humidity sensor 307 is configured to measure a humidity of an operating environment of the agriculture machine 200. For example, the ambient humidity sensor 307 is the second sensor 123 depicted in FIG. 1D. The bale chamber humidity sensor 309 is configured to measure a humidity inside a baler chamber 210 of the agriculture machine 200. For example, the ambient humidity sensor 307 is the first sensor 122 depicted in FIG. 1B. The sensor assembly 306 is configured to provide the controller 301 a signal associated with a humidity measurement. In some embodiments, the sensor assembly 306 provides a signal that indicates humidity measurements of the ambient humidity sensor 307 and the bale chamber humidity sensor 309 to the controller 301.

The voltage regulator 311 maintains a constant voltage to components of the system 300. The voltage regulator 311 may be configured to regulate one or more AC or DC voltages provided to the system 300. In various implementations, the voltage regulator 311 may perform DC/DC power conversion, AC/AC power conversion, or AC/DC power conversion.

The graphical display screen 313 (e.g., a liquid crystal display [LCD]) is configured to output data in text and/or graphical format. In some embodiments, the graphical display screen 313 includes the bale controller 315 (e.g., graphical user interface), which is displayed to a user to provide a touch-sensitive display unit. In some implementations, the graphical display screen 313 is included as a component of a mobile device and is configured to communicate with the controller 301 and the bale controller 315 through a wired or wireless communication interface. In some implementations, the graphical display screen 313 and the bale controller 315 are positioned in an operator cab of the agriculture machine 200.

The bale controller 315 can be physically mounted to the agriculture machine 200 or, in some implementations, provided as distributed component of the controller 301 and configured to communicate with the controller 301 of the agriculture machine 200 and/or other individual components of the agriculture machine 200. The bale controller 315 is configured to control additional components (not shown) of the cylindrical baler 205 to generate a bale of crop material according to bale settings received from an operator of the agriculture machine 200. For example, bale settings may include a bale diameter setting, a bale density setting, a preservative rate setting, a moisture setting, and/or other settings that define characteristics of a bale of crop material.

In some embodiments, the controller 301 is configured to determine a moisture level of the crop material of the agriculture machine 200. The controller 301 utilizes the humidity measurements (e.g., signals representative of a change in capacitance) of water vapor in the air from the sensor assembly 306 to determine the moisture level of the crop material in the baler chamber 210. The controller 301 provides the humidity measurements to the processor 303. The processor 303 determines a humidity value associated with the humidity measurements received from the controller 310. For example, the processor 303 receives signals indicating a change in capacitance of the ambient humidity sensor 307 and the bale chamber humidity sensor 309. The processor 301 determines a value for the humidity of the baler chamber 210 and the operating environment of the agriculture machine 200 by linearizing the change in capacitance of the ambient humidity sensor 307 and the bale chamber humidity sensor 309. The processor 301 determines a moisture level of the crop material in the baler chamber 210 using the humidity values (e.g., relative humidity data) of the baler chamber 210 and the operating environment of the agriculture machine 200. In some instances, the controller 301 stores the moisture level in the memory 305. For example, the controller 301 may write a CAN message that includes the moisture level of the crop material to a CAN message buffer (e.g., the memory 305). The CAN message is accessible to the baler controller 315 via a CAN bus. In other instances, the controller 301 provides the moisture level to the bale controller 315 and/or the graphical display screen 313. The controller 301 may provide the moisture level to the bale controller 315 and/or the graphical display screen 313 in response to receiving a request for a moisture level of the crop material in the baler chamber 210.

In some embodiments, the controller 301 is configured to control an alert based on the moisture level of the crop material of the agriculture machine 200 and threshold moisture level of a set of bale settings. the controller 301 is configured to generate and transmit an alert signal to the bale controller 315 and/or the graphical display screen 313. In some instances, the alert signal may enable a visual, auditory, and/or haptic alert output. In some embodiments, the controller 301 is configured to modify an operation of the agriculture machine 200 based on the moisture level of the crop material of the agriculture machine 200 and threshold moisture level of a set of bale settings. For example, the alert signal may cause the bale controller 315 to adjust one or more bale settings, such as, for example, a bale diameter setting, a bale density setting, or a preservative rate setting, according to the moisture level of the crop material.

Figure 4:
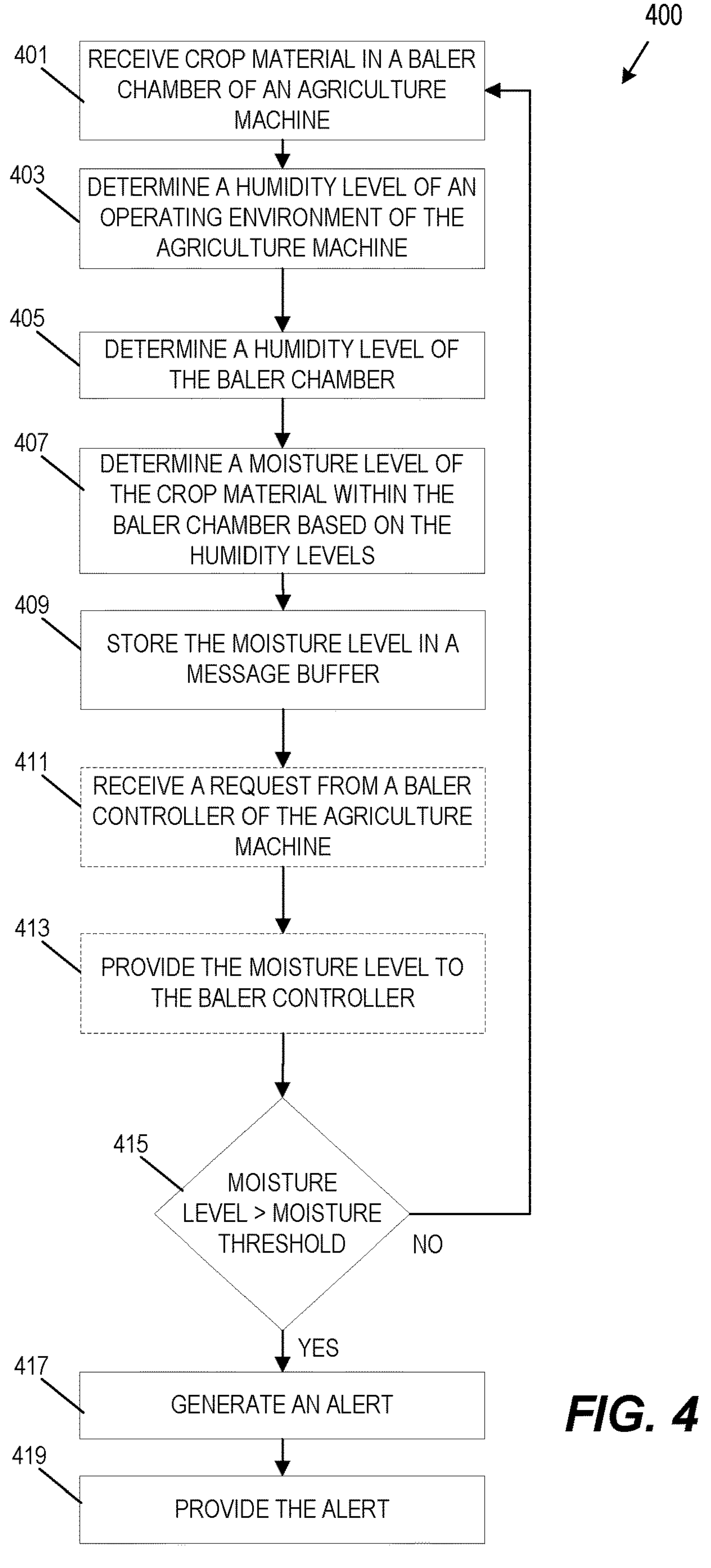
FIG. 4 is a flowchart of a method of controlling operation of an agriculture machine based on a moisture level of crop material according to embodiments in the present disclosure.

FIG. 4 is an example of a method 400 in which the controller 301 controls operation of an agriculture machine 200 based on a moisture level of crop material, according to implementations in the present disclosure. The agriculture machine 200 receives crop material in a baler chamber of an agriculture machine (step 401). In some implementations, the agriculture machine 200 includes the cylindrical baler 205 having the baler chamber 210. As the agriculture machine 200 traverses a field crop material from a surface of the field enters the baler chamber 210 via the crop material inlet 215.

The controller 301 determines a humidity level of an operating environment of the agriculture machine (step 403). In some implementations, the controller 301 receives a signal associated with a humidity measurement of an operating environment of the agriculture machine 200 from the ambient humidity sensor 307 of the sensor assembly 306. The controller 301 determines a value for the humidity of the operating environment of the agriculture machine 200 based on a change in capacitance of the ambient humidity sensor 307.

The controller 301 determines a humidity level of the baler chamber (step 405). In some implementations, the controller 301 receives a signal associated with a humidity measurement of the humidity inside the baler chamber 210 of the agriculture machine 200 from the bale chamber humidity sensor 309 of the sensor assembly 306. The controller 301 determines a value for the humidity of the baler chamber 210 based on a change in capacitance of the bale chamber humidity sensor 309.

The controller 301 determines a moisture level of the crop material within the baler chamber based on the humidity levels (step 407). In some implementations, the controller 301 determines a moisture level of the crop material in the baler chamber 210 using a value for humidity of the baler chamber 210 determined in step 405 and a value for humidity of the operating environment of the agriculture machine 200 determined in step 403. The controller 301 stores the moisture level in a message buffer (step 409). In some implementations, the controller 301 stores moisture data, determined in step 409, for the crop material in the baler chamber 210 in the memory 305. In some embodiments, the controller 301 generates a CAN message using the moisture data that is determined in step 409 and stores the CAN message in the memory 305.

The controller 301 receives a request from a baler controller of the agriculture machine (step 411). In some implementations, the controller 301 receives a request from the baler controller 315. The controller 301 provides the moisture level to the baler controller (step 413). In some implementations, the controller 301 transmits the moisture level, determined in step 407, for the crop material in the baler chamber 210 to the baler controller 315 and/or the graphic display screen 313. In some embodiments, the controller 301 transmits the moisture level, determined in step 407, for the crop material in the baler chamber 210 to the baler controller 315 in response to receiving the request in step 411.

The controller 301 determines whether the moisture level exceeds a moisture threshold (step 415). In some implementations, the controller 301 compares a value for the moisture level of the crop material in the baler chamber 210 to a moisture threshold value of a set of bale settings from the baler controller 315. In some instances, when the value for the moisture level of the crop material in the baler chamber 210 is less than or equal to the moisture threshold value (step 415 "NO" branch), the controller 301 continues to determine and compare moisture levels or crop material of the baler chamber 210 to the moisture threshold value. In other instances, when the value for the moisture level of the crop material in the baler chamber 210 is greater than the moisture threshold value (step 415 "YES" branch), the controller 301 enables an alert on the graphical display screen 313 and/or the baler controller 315.

The controller 301 generates an alert (step 417). In some implementations, the controller 301 generates an alert signal. In some instances, the controller 301 generates the alert signal for the graphical display screen 313 and the alert signal causes a visual alert indication on an interface to be displayed on the graphical display screen 313. In other implementations, the controller 301 generates the alert signal for the baler controller 315 and the alert signal causes the baler controller 315 to modify a set of baler settings for the baler chamber 210. The controller 301 provides the alert (step 419). In some implementations, the controller 301 transmits an alert signal that is generated to the graphical display screen 313, the baler controller 315, and/or another alert device (not shown).

Accordingly, the devices, the systems, and the methods described in this disclosure provide, among other things, moisture sensing capabilities without contacting the crop material entering an agricultural machine. The mechanism also prevents deposits of crop material, which negatively impact the accuracy of a sensing device, from accumulating on the mechanism. Other features and advantages are set forth in the following claims.

What is claimed is:

1. A moisture sensor assembly (100) for an agriculture machine (200), the moisture sensor assembly (100) comprising:

a housing (102) in the form of a single housing defining at least two apertures (116, 117) therethrough, wherein the housing (102) is configured to impede material deposits associated with operation of the agriculture machine (200) from entering the housing (102), wherein the housing (102) includes a body, a first surface, and a second surface, the first surface positioned at a first end of the body opposite the second surface, wherein the first surface includes a first aperture of the at least two apertures and the second surface includes a second aperture of the at least two apertures;

at least two sensors (122, 123) disposed within the housing (102), wherein a first sensor (122) of the at least two sensors (122, 123) is configured to measure a humidity inside a chamber (210) of the agriculture machine (200) and the first sensor (122) is disposed in a first sub-chamber (121) of the housing (102), and wherein a second sensor (123) of the at least two sensors (122, 123) is configured to measure a humidity of an operating environment of the agriculture machine (200) and the second sensor (123) is disposed in a second sub-chamber (124) of the housing (102), wherein the first sub-chamber (121) is isolated from the second sub-chamber (124), wherein the first aperture (116) of the at least two apertures (116, 117) is positioned to allow air from inside the chamber (210) into the first sub-chamber (121) and the second aperture (117) of the at least two apertures (116, 117) is positioned to allow air from the operating environment of the agriculture machine (200) into the second sub-chamber (124); and an electronic controller (301) communicably coupled to the at least two sensors (122, 123) and configured to:

receive, from the first sensor (122), a first signal representative of the humidity inside the chamber (210) of the agriculture machine (200), receive, from the second sensor (123), a second signal representative of the humidity of the operating environment of the agriculture machine (200), determine a moisture level of crop material in the chamber (210) of the agriculture machine (200) based at least in part on the humidity inside the chamber (210) and the humidity of the operating environment, wherein the electronic controller (301) is configured to modify operation of the agriculture machine (200) based at least in part on the moisture level of the crop material in the chamber (210).

2. The moisture sensor assembly (100) of claim 1, wherein the housing (102) is mounted to a surface of the agriculture machine (200), and wherein the first sensor (122) and the second sensor (123) include a sensor probe and provide a change in capacitance of a material of the sensor probe due to changes in the humidity inside the chamber (210) and the humidity of the operating environment.

3. The moisture sensor assembly (100) of claim 2, wherein the agriculture machine (200) is a cylindrical baler (205) that includes a crop material inlet (215), and wherein the housing (102) is positioned in proximity to the crop material inlet (215) of the cylindrical baler (210).

4. The moisture sensor assembly (100) of claim 2, wherein the agriculture machine (200) includes a crop material pick up mechanism (240) that is configured to feed the crop material into the chamber (210), and wherein the housing (102) is mounted to the crop material pick up mechanism (240) and positioned in proximity to an output of the crop material pick up mechanism (240).

5. The moisture sensor assembly (100) of claim 1, wherein the housing (102) is disposed in an opening in a surface of the agriculture machine (200), and wherein the first sensor (122) and the second sensor (123) include a sensor probe and provide a change in capacitance of a material of the sensor probe due to changes in the humidity inside the chamber (210) and the humidity of the operating environment.

6. The moisture sensor (100) of claim 1, wherein the electronic controller (301) is configured to:

enable an alert on the agriculture machine (200) in response to determining the moisture level of the crop material in the chamber (210) exceeds a moisture threshold value, wherein the alert is displayed on a graphical display screen (313).

7. A control system (300) for an agriculture machine (200), the control system (300) comprising:

a moisture sensor assembly (100), in the form of a single housing, that includes at least two sensors (122, 123) and at least two apertures (116, 117), wherein a first sensor (122) of the at least two sensors (122, 123) is configured to measure a humidity inside a chamber (210) of the agriculture machine (200) and the first sensor (122) is disposed in a first sub-chamber (121) of the housing, and wherein a second sensor (123) of the at least two sensors (122, 123) is configured to measure a humidity of an operating environment external to the agriculture machine (200) and the second sensor (123) is disposed in a second sub-chamber (124) of the housing, wherein the first sub-chamber (121) is isolated from the second sub-chamber (124). wherein the moisture sensor assembly (100) includes a body, a first surface, and a second surface, the first surface positioned at a first end of the body opposite the second surface, wherein the first surface includes a first aperture (116) of the at least two apertures (116, 117) and the second surface includes a second aperture (117) of the at least two apertures (116, 117), wherein the first aperture (116) of the at least two apertures (116, 117) is positioned to allow air from inside the chamber (210) into the first sub-chamber (121) and the second aperture (117) of the at least two apertures (116, 117) is positioned to allow air from the operating environment of the agriculture machine (200) into the second sub-chamber (124), and an electronic controller (301) that includes an electronic processor (303) and a memory (305), the electronic controller (301) communicably coupled to the at least two sensors (122, 123), the electronic processor (303) configured to receive, from the first sensor (122), a first signal representative of the humidity inside the chamber (210) of the agriculture machine (200);

receive, from the second sensor (123), a second signal representative of the humidity of the operating environment external to the agriculture machine (200);

determine a moisture level of crop material in the chamber (210) of the agriculture machine (200) based at least in part on the humidity inside the chamber (210) and the humidity of the operating environment external to the agriculture machine (200); and modify operation of the agriculture machine (200) based at least in part on the moisture level of the crop material in the chamber (210).

8. The control system (300) of claim 7, wherein the control system (300) includes a graphical display screen (313), and the electronic processor (303) is further configured to generate a controller area network (CAN) message based on the moisture level of the crop material in the chamber (210) of the agriculture machine (200) that is determined; and store the CAN messaged in the memory (305), wherein the memory (305) is a CAN buffer.

9. The control system (300) of claim 8, wherein the electronic processor (303) is further configured to receive, from a bale controller (315), a request; and transmit the CAN message in the memory (305) to the bale controller (315).

10. The control system (300) of claim 7, wherein the control system (300) includes a graphical display screen (313), and the electronic processor (303) is further configured to generate an alert in response to determining the moisture level of the crop material in the chamber (210) exceeds a moisture threshold value; and display the alert on the graphical display screen (313).

11. The control system (300) of claim 8, wherein determining the moisture level of the crop material in the chamber (210) of the agriculture machine (200) based on the humidity inside the chamber (210) and the humidity of the operating environment, the electronic processor (303) is further configured to wherein the first sensor (122) and the second sensor (123) include a sensor probe, measure a change in capacitance of a material of the sensor probe due to changes in the humidity inside the chamber (210) and the humidity of the operating environment.

12. The control system (300) of claim 7, wherein the moisture sensor assembly (100) includes at least two apertures (116, 117) therethrough, wherein a first aperture (116) of the at least two apertures (116, 117) is configured to allow airflow from inside a chamber (210) of the agriculture machine (200) while impeding material deposits associated with operation of the agriculture machine (200) from collecting on the first sensor (122), wherein a second aperture (117) of the at least two apertures (116, 117) is configured to allow airflow from the operating environment external to the agriculture machine (200) while impeding material deposits associated with operation of the agriculture machine (200) from collecting on the second sensor (123).

13. The control system (300) of claim 7, wherein the moisture sensor assembly (100) is disposed in an opening in a surface of the agriculture machine (200).

14. The moisture sensor (100) of claim 1, wherein the electronic controller (301) is configured to generate and transmit an alert signal to adjust one or more bale settings selected from a group consisting of: a bale diameter setting, a bale density setting, and a preservative rate setting, the alert signal based on the moisture level of the crop material in the chamber (210).

15. A method for modifying operation of an agriculture machine (200) based on a moisture level of crop material, the method comprising:

receiving crop material in a chamber (210) of the agriculture machine (200), wherein the agriculture machine (200) is a cylindrical baler (205);

determining, with an electronic processor (303), a humidity of the chamber (210) of the agriculture machine (200) based on a first signal of a first sensor (122) of a moisture sensor assembly (100) in the form of a single housing and the first sensor (122) is disposed in a first sub-chamber (121) of the housing, wherein the first signal is representative of the humidity inside the chamber (210) of the agriculture machine (200), wherein the moisture sensor assembly (100) includes at least two apertures (116, 117), a body, a first surface, and a second surface, the first surface positioned at a first end of the body opposite the second surface, wherein the first surface includes a first aperture (116) of the at least two apertures (116, 117) and the second surface includes a second aperture (117) of the at least two apertures (116, 117);

determining, with the electronic processor (303), a humidity of an operating environment external to the agriculture machine (200) based on a second signal of a second sensor (123) of the moisture sensor assembly (100) and the second sensor (123) is disposed in a second sub-chamber (124) of the housing, wherein the second signal is representative of the humidity of an ambient environment of the agriculture machine (200) wherein the first aperture (116) of the at least two apertures (116, 117) is positioned to allow air from inside the chamber (210) into the first sub-chamber (121) and the second aperture (117) of the at least two apertures (116, 117) is positioned to allow air from the operating environment of the agriculture machine (200) into the second sub-chamber (124), wherein the first sub-chamber (121) is isolated from the second sub-chamber (124);

determining, with the electronic processor (303), a moisture level of the crop material in the chamber (210) of the agriculture machine (200) based at least in part on the humidity inside the chamber (210) and the humidity of the operating environment; and modifying, with the electronic processor (303), operation of the agriculture machine (200) based at least in part on the moisture level of the crop material in the chamber (210).

16. The method of claim 15, further comprising:

generating, with the electronic processor (303), a controller area network (CAN) message based at least in part on the moisture level of the crop material in the chamber (210) of the agriculture machine (200) that is determined; and storing, with the electronic processor (303), the CAN message in a memory (305), wherein the memory (305) is a CAN buffer.

17. The method of claim 16, further comprising:

receiving, with the electronic processor (303) from a bale controller (315), a request; and transmitting, with the electronic processor (303), the CAN message in the memory (305) to the bale controller (315).

18. The method of claim 15, further comprising:

generating, with the electronic processor (303), an alert in response to determining the moisture level of the crop material in the chamber (210) exceeds a moisture threshold value; and displaying, with the electronic processor (303), the alert on a graphical display (313) of the agriculture machine (200).

19. The method of claim 15, further comprising:

determining, with the electronic processor (303), the moisture level of the crop material in the chamber (210) exceeds a moisture threshold value; and modifying, with the electronic processor (303), a setting of the cylindrical baler (205) to change a characteristic of a bale of the crop material forming in the chamber (210) in response to determining the moisture level of the crop material in the chamber (210) exceeds a moisture threshold value.

20. The method of claim 15, wherein the at least two apertures (116, 117) impede material deposits associated with operation of the agriculture machine (200) from collecting on the first sensor (122) and the second sensor (123).

* * * * *